June 23, 1970 W. HIRSCHMANN 3,517,250

HORIZONTAL DEFLECTION CIRCUIT FOR PICTURE TUBE OF TELEVISION SYSTEM

Filed May 31, 1968

3,517,250

HORIZONTAL DEFLECTION CIRCUIT FOR PICTURE TUBE OF TELEVISION SYSTEM

Walter Hirschmann, Munich, Germany, assignor to Siemens Aktiengesellschaft, a corporation of Germany Filed May 31, 1968, Ser. No. 733,560
Claims priority, application Germany, June 7, 1967, S 110,223
Int. Cl. H01j *29/72, 29/76;* H03k *4/60*
U.S. Cl. 315—19 7 Claims

ABSTRACT OF THE DISCLOSURE

A source of feeding voltage is coupled to the capacitance of the tank circuit of a scanning transistor via a switch-operated pulse keyer during the blocking phase of the transistor whereby the voltage of the capacitance is at least equal to the recoil voltage occurring at the capacitance. A charge capacitor is connected in series with the inductance of the tank circuit between the collector and emitter electrodes of the transistor, the capacitor being connected to the emitter electrode.

Description of the invention

The present invention relates to a television system. More particularly, the invention relates to a circuit arrangement for horizontal deflection of the electron beam of a picture tube of a television system.

The present invention relates to a circuit arrangement for horizontal deflection of the electron beam of a picture tube of a television system including a scanning transistor which is controlled via its base circuit and which has a diode connected between its emitter and collector electrodes in opposition to the forward direction of said transistor. A tank circuit is connected in parallel with the diode. Circuits of this type are known. Thus, for example, in the Bulletin of the Swiss Electro-technical Association, Dec. 12, 1964, pages 1239 to 1243, such circuits are referred to as restrictive diode circuits.

Restrictive diode circuits of the aforedescribed type are primarily utilized in transistorized television circuitry. The tank circuit is energized by a DC source. The line end transistor is controlled via its base circuit. Furthermore, circuits of this type usually include a winding of the high voltage transformer which provides the high anode voltage for the picture tube from the restoring voltage of the tank circuit. The horizontal deflector yoke comprises the inductance of the tank circuit so that the deflection field for the horizontal deflector of the electron beam is derived directly from the current flow through said inductance.

The restrictive diode circuit typically utilizes a source of feeding voltage having a relatively low voltage to compensate for the flow losses of the circuit. In addition to the current for the deflection power, the current for restoring the losses flows through the inductance of the tank circuit. A recoil voltage, which has a magnitude eight times that of the feeding voltage, occurs at the capacitance of the tank circuit and therefore between the emitter and collector electrodes of the scanning transistor during the reset of the electron beam of the picture tube.

The deflection yoke provides a magnetic deflection output in accordance with the maximum deflection angle of the electron beam. The maximum deflection angle of the electron beam depends upon the type of picture tube. Wide angle picture tubes, as utilized today, cause considerable problems in the supply of the required deflection output by conventional restrictive circuitry, since the output is limited by the permissible power loss of the scanning transistor. The required deflection output or power may be provided either by high currents and a relatively small voltage or by small currents and a relatively high voltage. There are many reasons why a horizontal deflection circuit is not operated with high currents, however. In the customary non-transformer coupling of the deflection yoke, where the inductance of the tank circuit essentially comprises the deflection yoke itself, the structural requirements of said deflection yoke such as, for example, the flexibility of the wire, cannot permit an increase in current without winding losses. Furthermore, a high collector current produces considerable heat in the scanning transistor and thus leads to an increased loss in power.

The high anode voltage for the picture tube is provided by transforming and rectifying the restoring voltage. In the primary winding of the transformer, which must be utilized, large currents would have to flow at relatively low voltage. The winding must thus have a low ohmic resistance. The resultant large transformation ratio would cause considerable scattering and resultant losses. Losses due to high currents would be further increased while being compensated for at the same relatively low feeding voltage. The feeding voltage must therefore be increased in order to satisfy the requirements for greater deflection power and for simultaneous compensation for power losses.

If the feeding voltage is increased, problems relating to the dielectric strength of the biasing potential or blocking voltage of the scanning transistor arise. If the feeding voltage has a conventional magnitude of about 30 volts at a power required by the deflection winding which is present during the return of the electron beam in the tank circuit, the components have dimensions and magnitudes which are such, relative to the return or reset time, that a maximum voltage of about 220 volts occurs at the capacitance of the tank circuit. The same voltage is applied as a blocking voltage between the emitter and collector electrodes of the scanning transistor during the return or reset phase which is also the blocking phase for said transistor. There are, at the present time, transistors which will suitably withstand a blocking voltage of about 250 volts. When the deflection power is increased, due to the higher feeding voltage resulting from the foregoing reasons, considerable difficulties arise because the multiplied feeding voltage, occurring as a blocking voltage at the scanning transistor, imposes great demands upon said transistor. At the present time, high voltage transistors may be constructed which are suitable for rectified power supply voltage of 150 to 200 volts. Such transitors must withstand blocking voltages of up to 2000 volts. It is very difficult to provide a transistor which will withstand 2000 volts.

The principal object of the present invention is to provide a new and improved horizontal deflection circuit for the picture tube of a television system.

An object of the present invention is to avoid the necessity for using transistors which must withstand blocking voltages up to 2000 volts in a horizontal deflection circuit for the picture tube of a television system.

An object of the present invention is to provide a horizontal deflection circuit for the picture tube of a television system which provides the required power for horizontal deflection without the use of a power transformer.

An object of the present invention is to provide a horizontal deflection circuit for the picture tube of a television system which provides the required voltage from a charge capacitor.

An object of the present invention is to provide a horizontal deflection circuit for the picture tube of a television system in which high voltage stability is provided.

Another object of the present invention is to provide a horizontal deflection circuit for the picture tube of a television system which operates with efficiency, effectiveness and reliability and is of simple structure.

In accordance with the present invention a circuit arrangement for horizontal deflection of the electron beam of the picture tube of a television system comprises a scanning transistor having emitter, base and collector electrodes and a base circuit. The base circuit of the transistor controls the transistor. A diode is connected between the emitter and collector electrodes of the transistor in opposition to the forward direction of the transistor. A tank circuit is connected in parallel with the diode. The tank circuit has a capacitance and an inductance. A source of feeding voltage is coupled to the tank circuit via a switch-operated pulse keyer during the blocking phase of the transistor whereby the voltage of the feeding voltage source is at least equal to the recoil voltage occurring at the capacitance. A charge capacitor is connected in series with the inductance of the tank circuit between the collector and emitter electrodes of the transistor, the capacitor being connected to the emitter electrode.

The source of feeding voltage is connected to the capacitance of the tank circuit. The pulse keyer comprises a switch and the source of feeding voltage is connected to the emitter electrode of the transistor and to the tank circuit via the switch and the tank circuit is closed by the switch. The transistor is controlled by an inductor connected in the base circuit of the transistor and inductively coupled with the inductance of the tank circuit. A current limiting member is connected to the switch adjacent the source of feeding voltage and may comprise an oscillating circuit tuned to a selected harmonic vibration of the restoring frequency. The switch may comprise a push-pull keyer controlled by horizontal deflection pulses of the television system.

In order that the present invention may be readily carried into effect, it will now be described with reference to the accompanying drawing, wherein.

Figures 1, 2, 3:
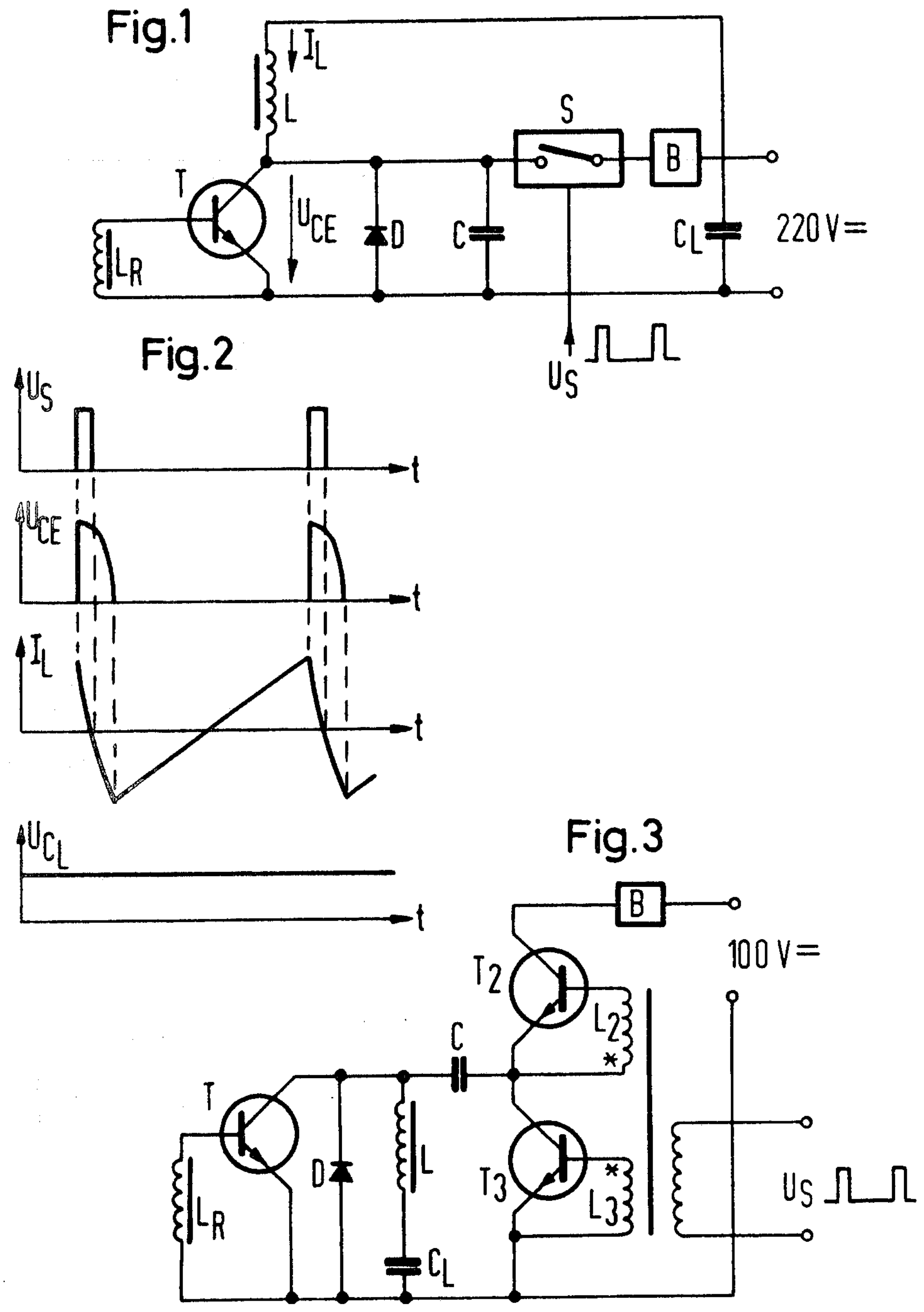
FIG. 1 is a circuit diagram of an embodiment of the horizontal deflection circuit of the present invention.
FIG. 2 is a graphic illustration of a series of wave forms which assist in explaining the operation of FIG. 1.
FIG. 3 is a circuit diagram of a modification of the horizontal deflection circuit of FIG. 1.

In the embodiment of FIG. 1, a diode D is connected between the emitter and collector electrodes of a scanning transistor T. A tank circuit, comprising a capacitance C and an inductance L, is also connected between the emitter and collector electrodes of the scanning transistor T. The tank circuit C, L is connected in parallel with the diode D.

A large charge capacitor $C_L$ is connected in series with the inductance L in the tank circuit between the collector and emitter electrodes of the scanning transistor T. The capacitor $C_L$ is connected to the emitter electrode. An inductor $L_R$ is connected in the base circuit of the scanning transistor T and is inductively coupled with the inductance L of the tank circuit. The inductor $L_R$ controls the scanning transistor T.

The diode D and the scanning transistor T function as electronic switches. The diode D is controlled by the voltage of the capacitance C of the tank circuit and the scanning transistor T is controlled by the voltage induced in the inductor $L_R$ via the inductance L of said tank circuit. The diode D is connected in a manner whereby it connects current in opposition to the forward direction of the scanning transistor T.

A source of feeding voltage, indicated as 220 volts, is coupled to the capacitance C of the tank circuit via a switch-operated pulse keyer S during the blocking phase of the scanning transistor T whereby the voltage of said feeding voltage source is at least equal to the recoil voltage occurring at said capacitance. During the first six microseconds of the line return or reset, the switch which constitutes the switch-operated pulse keyer S, comprises a push-pull keyer controlled by the horizontal deflection pulses of the television system. The switch S periodically connects the source of feeding voltage to the capacitance C via a current limiting member B. The current limiting member B is connected in circuit between the source of feeding voltage and the switch S. The voltage provided by the source of feeding voltage is 220 volts DC, as indicated in the diagram representing $U_{CL}$ of FIG. 2.

FIG. 2 includes a curve of the current $I_L$. The current $I_L$ is a maximum on the termination of the line scanning and flows, at a rapidly decreasing rate, in the capacitance C at the initiation of the line return or reset. The capacitance C is thus charged by the current $I_L$, but very rapidly reaches a maximum energy due to the feeding DC voltage of 220 volts. The maximum energy is transferred to the inductance L after the termination of the DC voltage, via a negative increasing current. Upon the termination of the line return or reset, the current $I_L$ again reaches a negative maximum. At such point, the voltage at the capacitance C has dropped to zero. Upon the initiation of the line scanning, the diode D is charged by the charge capacitor $C_L$ with a conducting biasing voltage and short-circuits the capacitance C. The current $I_L$ obtains a positive gradient and induces in the inductor $L_R$ a voltage which switches the scanning transistor T to its conductive condition.

The current $I_L$ then flows via the diode D in linearly decreasing values until it reaches zero. The current then flows via the scanning transistor T in a positive direction and increases until it reaches its maximum value at the termination of the line scanning. The line return or reset again occurs when the DC voltage is again applied to the capacitance C. During the line scanning, the charge capacitor $C_L$ functions as a voltage source which provides the current $I_L$ in a positive direction and provides a constant DC voltage of about 30 volts for the supply of the television system.

The sawtooth current $I_L$ (FIG. 2) in the inductance L supplies the horizontal deflection field for the electron beam of the picture tube. During the line scanning or forward run, the current curve $I_L$ is linear as during the line return or resetting. Such curve represents a half oscillation of the tank circuit C, L superimposed on the curve of the current delivered to the tank circuit by the DC feeding voltage of 220 volts. This is clearly illustrated in FIG. 2, wherein the uppermost curve is that of the voltage $U_S$ at the switch-operated pulse keyer S. The absiccsa represents time $t$ and the ordinate represents the voltage at the pulse keyer $U_S$. The second curve from the top of FIG. 2 illustrates the collector-emitter voltage $U_{CE}$ of the scanning transistor T. In this curve, the abscissa represents the time $t$ and the ordinate represents the collector-emitter voltage $U_{CE}$. In FIG. 2, the second curve from the bottom illustrates the current $I_L$. The abscissa represents the time $t$ and the ordinate represents the current $I_L$. The bottom curve of FIG. 2 illustrates the voltage $U_{CL}$ across the charge capacitor $C_L$. In this curve, the abscissa represents the time $t$ and the ordinate represents the charge capacitor voltage $U_{CL}$.

It is thus seen that in accordance with my invention the fact that during the utilization of a feeding voltage source with low voltage, a relatively high blocking voltage occurs at the scanning transistor, is utilized for the determining of additional application of a DC high voltage source to the circuit during the blocking phase. This is done in such a manner that all the power, including the deflection power and the losses, is derived from the DC source of high voltage instead of the DC source of low voltage. The additional DC voltage may also be higher than the recoil voltage which is provided at the capacitance C of the tank circuit. Its magnitude is limited only by the permissible blocking voltage of the scanning transistor T.

The current limiting member B is connected to the switch S and functions to limit the charge current which flows via said switch from the source of feeding voltage to the capacitance C of the tank circuit C, L. The current limiting member B may comprise an oscillating circuit tuned to a selected harmonic vibration of the restoring frequency. The current limiting member B may thus comprise an ohmic resistance and an inductance or a tank circuit tuned to the suitable harmonic of the restoring frequency. This permits the additional voltage source to deliver a lower voltage than the recoil voltage.

The circuit arrangement of the present invention thus permits the provision of the required power for horizontal deflection from the AC supply without the need for a power transformer, the AC supply being 220 volts after normal rectification. This permits adherence to the limitations imposed by blocking voltage and peak current of conventional transistors. Furthermore, the circuit arrangement of my invention permits the required low voltage for the television system to be derived from the charge capacitor $C_L$. This thus eleminates the need for a battery supply of 30 volts. The scanning transistor may also be utilized to stabilize the high voltage via pulse control.

In the modification of FIG. 3, the diode D and the tank circuit C, L are connected between the emitter and collector electrodes of the scanning transistor T, as in the embodiment of FIG 1. The large charge capacitor $C_L$ is connected in series with the inductance L of the tank circuit. The inductor $L_R$ is connected in the base circuit of the scanning transistor T and is inductively coupled with the inductance L of the tank circuit.

In the modification of FIG. 3, a source of feeding voltage is not periodically connected to the capacitance C of the tank circuit, as in the embodiment of FIG. 1. However, in the modification of FIG. 3, the source of feeding voltage is connected to the tank circuit via the current limiting member B to a point between the capacitance C of the tank circuit and the emitter of the scanning transistor $T_2$ functions as a switch to connect the DC voltage of 100 volts of the source of feeding voltage to the tank circuit during the line return or reset. During the remaining time another transistor $T_3$ operates as a switch to close the tank circuit so that the currents and voltages may follow essentially the same pattern described with reference to the embodiment of FIG. 1. The transistors $T_2$ and $T_3$ are controlled by inductors $L_2$ and $L_3$, respectively. The inductor $L_2$ is connected in the base circuit of the transistor $T_2$ and the inductor $L_3$ is connected in the base circuit of the transistor $T_3$. The inductors $L_2$ and $L_3$ control the corresponding transistors by inductively transmitting pulses.

When the line end transistor T in the embodiment of FIG. 1 or the embodiment of FIG. 3 is controlled directly via the collector electrode and additionally via the base electrode, via feedback, an adverse phase displacement may occur between the collector current and the base voltage in transistors which switch slowly. This may be avoided by utilizing an appropriate delay component in order to cancel the phase displacement or, instead of a feedback control, the base electrode of the scanning transistor may be controlled by a signal derived from the horizontal deflection pulses.

My idea of directing energy during a favorable phase, from a suitable source directly to the tank circuit of a reverse circuit, is, of course, not limited to the disclosed embodiments, but may be utilized for other purposes besides those relating to horizontal deflection in a television system.

While the invention has been described by means of specific examples and in specific embodiments, I do not wish to be limited thereto, for obvious modifications will occur to those skilled in the art without departing from the spirit and scope of the invention.

I claim:

1. A circuit arrangement for horizontal deflection of the electron beam of a picture tube of a television system, said circuit arrangement comprising a scanning transistor having emitter base and collector electrodes and a base circuit;

means connected in the base circuit of said transistor for controlling said transistor;

a diode connected between the emitter and collector electrodes of said transistor in opposition to the forward direction of said transistor;

a tank circuit connected in parallel with said diode, said tank circuit having a capacitance and an inductance;

a switch-operated pulse keyer;

a source of feeding voltage coupled to the capacitance of said tank circuit via said pulse keyer during the blocking phase of said transistor whereby the voltage of said feeding voltage source is at least equal to the recoil voltage occurring at said capacitance; and a charge capacitor connected in series with the inductance of the tank circuit between the collector and emitter electrodes of said transistor, said capacitor being connected to the emitter electrode.

2. A circuit arrangement as claimed in claim 1, wheresaid source of feeding voltage is connected to the capacitance of said tank circuit.

3. A circuit arrangement as claimed in claim 1, wherein said pulse keyer comprises a first switch and a second switch and wherein said source of feeding voltage is arranged in said tank circuit between the emitter electrode of said transistor and the capacitance of said tank circuit via said first switch and said tank circuit is closed by said second switch.

4. A circuit arrangement as claimed in claim 1, wherein said means connected in the base circuit of said transistor comprise an inductor inductively coupled with the inductance of said tank circuit.

5. A circuit arrangement as claimed in claim 3, further comprising a current limiting member connected to said first switch adjacent said source of feeding voltage.

6. A circuit arrangement as claimed in claim 3, wherein said first switch and said second switch comprise a pushpull keyer controlled by horizontal deflection pulses of the television system.

7. A circuit arrangement as claimed in claim 5, wherein said current limiting member comprises an oscillating circuit tuned to a selected harmonic vibration of the restoring frequency.

References Cited

UNITED STATES PATENTS

| | | |
|---|---|---|
| 2,995,679 | 8/1961 | Skoyles. |
| 3,028,508 | 4/1962 | Helsdon. |
| 3,210,601 | 10/1965 | Walker. |
| 3,235,766 | 2/1966 | Martin et al. |
| 3,323,001 | 5/1967 | Mackellar. |
| 3,404,310 | 10/1968 | Williams. |

RODNEY D. BENNETT, Primary Examiner

BRIAN L. RIBANDO, Assistant Examiner

U.S. Cl. X.R.

307—228; 315—27